July 17, 1956 R. H. STIEFFEL, JR 2,754,608
SHOCK ABSORPTION MECHANISM FOR FIREARMS
Filed Jan. 19, 1955

INVENTOR
RAY H. STIEFFEL JR.

BY *A. Yates Dowell*

ATTORNEY

United States Patent Office 2,754,608
Patented July 17, 1956

2,754,608

SHOCK ABSORPTION MECHANISM FOR FIREARMS

Ray H. Stieffel, Jr., Waveland, Miss.

Application January 19, 1955, Serial No. 482,789

4 Claims. (Cl. 42—74)

This invention relates to firearms and the like in which substantial shock is produced by the recoil, and more particularly to shock absorption mechanism for cushioning recoil and consequently absorbing a substantial amount of the shock that normally would be transmitted.

Devices have been produced which were intended to absorb or cushion the shock of recoil, however, these have been unsatisfactory for various reasons including complexity of manufacture, difficulty of assembly and disassembly, the necessity of altering the working parts of the devices to which they were applied, inefficiency of operation, and other problems.

It is an object of the invention to provide simple and inexpensive shock absorption mechanism capable of being produced economically, which can be easily applied, and will operate efficiently to cushion or absorb to a very substantial degree shock resulting from recoil.

Another object of the invention is to produce shock absorption mechanism, of reduced complexity, which can be readily assembled or taken apart for cleaning or other purposes, which will promote greater firing accuracy, will permit greater use of the same without soreness or injury to the user, and which can be used by a greater number of people and those who would be generally inclined to avoid the use of such weapons due to the great amount of shock usually felt.

Figure 1:
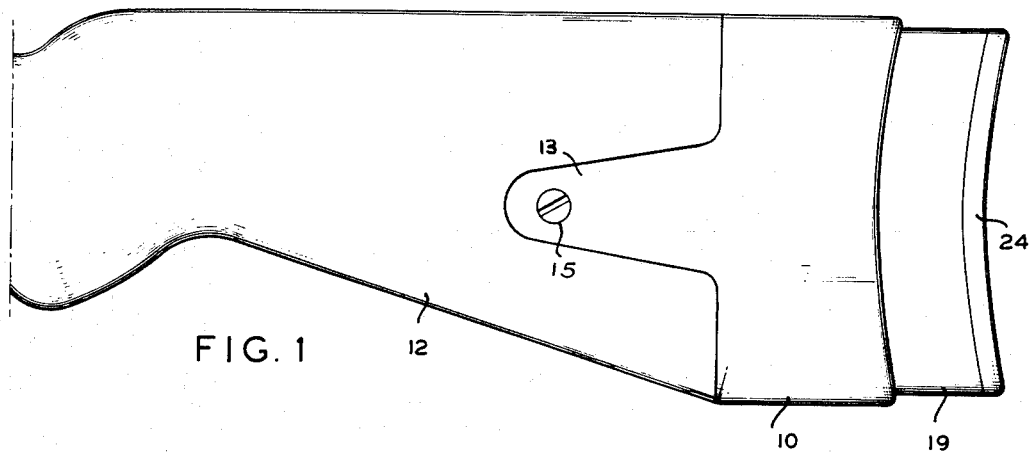
Figure 2:
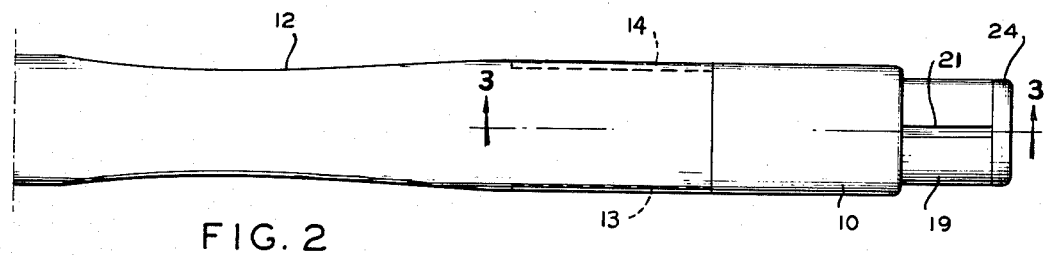
Figure 4:
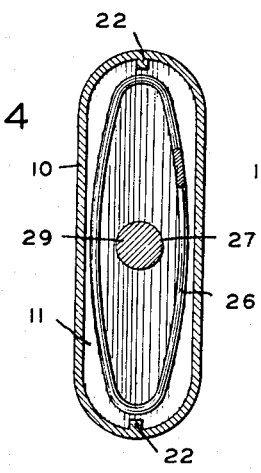
Figure 3:
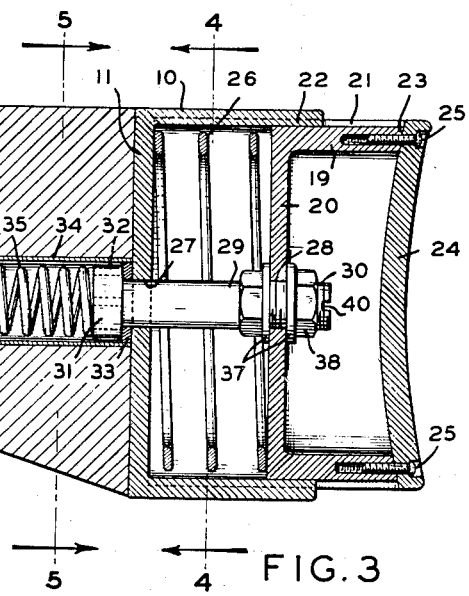
Figure 5:
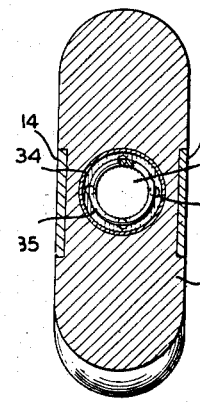

Other objects and advantages of the invention will be apparent from the following description taken in conjunction with the accompanying drawing wherein:

Fig. 1 is a fragmentary side elevation illustrating the application of the invention;

Fig. 2, a fragmentary top plan view;

Fig. 3, an enlarged fragmentary longitudinal section;

Fig. 4, a transverse section on the line 4—4 of Fig. 3; and,

Fig. 5, a transverse section on the line 5—5 of Fig. 3.

Briefly stated the invention comprises mechanism for cushioning shock and is illustrated as applied to the butt of a gunstock, being fitted thereover, and comprising a rearwardly opening housing with a plunger therein the rear or exterior portion of which is curved to facilitate its contact with the human arm.

The plunger is maintained in outermost position by means of an elliptical spring confined beneath the bottom or inner wall of the plunger and the corresponding wall of the housing. The plunger is limited in its outer position by means of a confining element in the form of an axially disposed rod or bolt the head of which is located in an axial cavity in the housing and the other or threaded end of which is located in an aligned opening in the corresponding wall of the plunger with a nut or lock washer on each side of such wall. Since the opposite ends of the bolt are located on the opposite sides of the housing and plunger walls the housing and plunger are held in assembled relation.

The head of the bolt is cylindrical and disposed in a cylindrical metal chamber in a cavity in the butt of the stock, and a helical spring is located axially between the piston forming head of the bolt and the bottom of the cylinder. In addition to the spring in the cylinder hydraulic fluid may also be contained, the piston forming bolt head being provided with one or more axial ports or canals through which the hydraulic fluid can flow from one side of the piston to the other although, if desired, the clearance between the piston and the cylinder wall may be ample so that the ports or canals may be omitted.

With continued reference to the drawing, the shock absorption mechanism of the present invention comprises a cup shaped housing of metal, plastic, or other material, comprising a cylindrical side wall 10 and a transverse inner or bottom wall 11 adapted to be disposed in snug contact with a device, the shock of which it is desired to absorb, such as, for example, the butt end of a stock 12 of a gun, attachment to such stock being accomplished by means of tapered countersunk bracket arms 13 and 14 received in place by screws or other fastening elements 15.

The bracket arms 13 and 14 may be integral with or separate from the housing, as disclosed being integral and preferably with such arms countersunk so that they will be flush with the side surfaces of the stock.

The structure described permits the ready disposition of the arms 13 and 14 in contact with the stock 12. Thus the housing may be simply and easily applied and attached to the stock.

In order to cushion shock a cup shaped plunger or shoulder piece of metal, plastic, or other material, is provided having an annular side wall 19 and a transverse or bottom wall 20 such plunger being slidably mounted within the housing and being maintained in proper alignment by a slot or grooves 21 in which is received a spline or tongue forming portion 22 of the wall 10 of the housing and so that the parts may move substantially freely relative to each other.

The outer surface of the annular wall 19 is provided with an inclined surface 23 which conforms to the curved inner surface of a shoulder piece 24 held in place by a series of screws or other fasteners 25. The curvature of the outer surface of the shoulder piece 24 is of a character to facilitate engagement with the shoulder of the user. The sides of the wall 10 of the housing are correspondingly curved (Fig. 1) to permit maximum telescopic movement of the plunger into the housing.

In order to cushion shock imparted to the wall 11 of the housing by means of the stock 12 of the gun a spring 26, elliptical in conformation, and which also may be elliptical in cross-section, is confined between the transverse wall 11 of the housing and the transverse wall 20 of the plunger, means being provided for maintaining the plunger and housing in telescopic relation with the separation thereof limited by such means.

The transverse wall 11 is provided with a central circular opening 27 and the transverse wall 20 of the plunger is provided with a circular opening 28. A cylindrical connecting member or bolt 29 is provided having a body of a diameter to fit snugly within the central opening 27 and having an externally threaded end 30 adapted to fit snugly within the central opening 28, the bolt 29 forming in effect a piston rod and the head 31 of the bolt forming a piston with a series of transverse ports or bleeder passages 32 therethrough (Figs. 3 and 5).

A cylinder 34 is of larger diameter than the piston 31 and, consequently, it is necessary that the stock be drilled and the cylinder and piston be inserted before the device is applied to the gunstock. The head of the bolt which forms the piston is larger than the opening 27 and is adapted to engage the transverse wall 11 about such opening. In order to seal the joint about the opening a packing gland 33 may be provided to seal against the escape of hydraulic fluid or to retain the hydraulic fluid, the piston being slidably received in the cylinder 34 imbedded in the stock 12, and a spring 35 is preferably disposed within the cylinder to operate with the hydraulic fluid in maintaining the piston in the position shown in Fig. 3 at the end of the cylinder so that the plunger will be in its outermost position.

A screw driver slot 40 is provided in the threaded end 30 so that in the installation of the device the bolt 29 may be held fixed while the nut 38 is rotated. It will be apparent that by adjusting the nuts 38 the positions of the bolt head within said cylinder may be varied.

In assembling the device the stock 12 is drilled or otherwise chambered and the cylinder 34 is installed. The spring 35 is placed within the cylinder and is followed by the bolt head or piston 31 and the packing 33. Thereafter the housing is applied with the piston rod 29 received through the opening 27 and the brackets 13 and 14 are countersunk so that their exterior surfaces will be substantially flush with the adjacent surfaces of the wood portion of the stock 12. Thereafter the screws or other fastening elements 15 are applied and the elliptical spring 26 is placed within the housing and the plunger is set in place with the ribs or splines 22 received within the grooves 21 and with the threaded end of the bolt located within the opening 28 in the transverse wall 20 of the plunger, washers 37 and nuts 38 are added to fasten the parts in assembled relation, the nut nearest the end of the bolt being rotated while a screw driver is held in the slot 40 for maintaining the piston rod and piston against rotation. Thereafter the member 24 may be applied such member being fastened in place by screws 25 to complete the assembling operation. Thus relatively simple shock absorbing means is provided which is easy to manufacture and apply and which requires no attention in use but which will absorb a large amount of the shock.

It will be obvious to those skilled in the art that various changes may be made in the invention without departing from the spirit and scope thereof and therefore, the invention is not limted by that which is illustrated in the specification, but only as indicated in the accompanying claims.

What is claimed is:

1. Shock absorption mechanism comprising a housing for attachment to a device the shock of which it is desired to absorb, said housing having a transverse wall adapted to be disposed in contact with said device and having laterally projecting arms for detachable connection with said device, a plunger telescopically associated with said housing and having a transverse wall substantially parallel to the transverse wall of said housing, tongue and groove means between said plunger and said housing for maintaining them in alignment, spring means between said housing and plunger tending to move them apart, separation limiting means connecting said housing and plunger and comprising a bolt with a piston forming head at one end and threads at its other end, said transverse walls having central openings receiving said bolt with its head and threaded end on the remote sides of said housing and plunger walls, the threaded end of said bolt having a screw driver slot whereby it can be held and a nut thereon rotated, a cylinder in which the piston forming head of said bolt is received, a coiled spring and hydraulic fluid disposed between the bottom of said cylinder and the surface of said bolt head tending to maintain said bolt head in one end of said cylinder, said bolt head and cylinder having surfaces spaced to permit the passage of hydraulic fluid around said bolt head, and a shoulder engaging member at the outer portion of said plunger.

2. Shock absorption mechanism comprising a housing for attachment to a device the shock of which is desired to absorb, said housing having a transverse wall adapted to be disposed in contact with said device and having laterally projecting arms for detachable connection with said device, a plunger telescopically associated with said housing and having a transverse wall substantially parallel to the transverse wall of said housing, tongue and groove means between said plunger and said housing for maintaining them in alignment, spring means between said housing and plunger tending to move them apart, separation limiting means connecting said housing and plunger and comprising a cylindrical member having an enlarged head at one end and fastening means on its other end, said transverse walls having central openings receiving said cylindrical member with said head on the remote side of one and said fastening means on the remote side of the other, said cylindrical member having means whereby it can be held and relative movement produced between it and said fastening means, a cylinder in which said head is received, means tending to maintain said piston in one end of the said cylinder including a coiled spring and hydraulic fluid disposed between the bottom of said cylinder and the surface of said head, said head and cylinder having surfaces spaced to permit the passage of hydraulic fluid in said cylinder around said piston.

3. Shock absorption mechanism comprising a housing for attachment to a device the shock of which it is desired to absorb, said housing having a transverse wall adapted to be disposed in contact with said device, a plunger telescopically associated with said housing and having a transverse wall substantially parallel to the transverse wall of said housing, tongue and groove means between said plunger and said housing for maintaining them in alignment, spring means between said housing and plunger tending to move them apart, separation limiting means connecting said housing and plunger and comprising a cylindrical member having an enlarged head at one end and fastening means on its other end, said transverse walls having central openings receiving said cylindrical member with the head on the remote side of one end and said fastening means on the remote side of the other, said cylindrical member having means whereby it can be held and relative movement produced between it and said fastening means, a cylinder in which said head is received, means tending to maintain said head in one end of the said cylinder including a coiled spring and hydraulic fluid disposed between the bottom of said cylinder and the surface of said head, said head and cylinder having surfaces spaced to permit the passage of hydraulic fluid in said cylinder around said head.

4. Shock absorption mechanism comprising a hollow cup shaped housing for attachment to a device the shock of which is desired to be absorbed, a hollow cup shaped plunger slidably mounted in said housing, a shoulder piece closing said cup shaped plunger and detachably connected thereto by threaded means, a spring with coils of a size to substantially fill said housing and tending to separate said housing and plunger, a tongue and groove connection between said plunger and said housing for maintaining them in alignment, said housing and plunger having openings therethrough and a connecting member located in said openings for preventing separation of said housing and plunger, means for anchoring said plunger to said connecting member so that said member will move axially with said plunger, and means in contact with the opposite end of said connecting member tending to maintain it in a definite position with said plunger outwardly of said housing.

References Cited in the file of this patent

UNITED STATES PATENTS

| 311,755 | Hermle | Feb. 3, 1885 |
| 837,601 | Behr | Dec. 4, 1906 |
| 2,292,351 | Carpenter et al. | Aug. 11, 1942 |
| 2,455,438 | Oppold | Dec. 7, 1948 |

FOREIGN PATENTS

| 275,834 | Switzerland | Feb. 1, 1952 |